(12) United States Patent
Parson et al.

(10) Patent No.: US 7,793,029 B1
(45) Date of Patent: Sep. 7, 2010

(54) TRANSLATION DEVICE APPARATUS FOR CONFIGURING PRINTED CIRCUIT BOARD CONNECTORS

(75) Inventors: Jerome W. Parson, Forest Grove, OR (US); Christopher A. Klein, Portland, OR (US)

(73) Assignee: NVIDIA Corporation, Santa Clara, CA (US)

( * ) Notice: Subject to any disclaimer, the term of this patent is extended or adjusted under 35 U.S.C. 154(b) by 239 days.

(21) Appl. No.: 11/132,080

(22) Filed: May 17, 2005

(51) Int. Cl.
G06F 13/36 (2006.01)
G06F 13/40 (2006.01)
G06F 13/00 (2006.01)
H05K 7/10 (2006.01)

(52) U.S. Cl. .................. 710/306; 710/301; 710/302; 710/307; 710/316

(58) Field of Classification Search ............... 710/306, 710/301, 302, 307, 316
See application file for complete search history.

(56) References Cited

U.S. PATENT DOCUMENTS

| | | |
|---|---|---|
| 3,940,740 A | 2/1976 | Coontz |
| 4,541,075 A | 9/1985 | Dill et al. |
| 4,773,044 A | 9/1988 | Sfarti et al. |
| 4,885,703 A | 12/1989 | Deering |
| 4,951,220 A | 8/1990 | Ramacher et al. |
| 4,985,988 A | 1/1991 | Littlebury |
| 5,036,473 A | 7/1991 | Butts et al. |
| 5,276,893 A | 1/1994 | Savaria |
| 5,392,437 A | 2/1995 | Matter et al. |
| 5,406,472 A * | 4/1995 | Simmons et al. ............... 700/4 |
| 5,448,496 A | 9/1995 | Butts et al. |
| 5,513,144 A | 4/1996 | O'Toole |
| 5,513,354 A | 4/1996 | Dwork et al. |
| 5,578,976 A | 11/1996 | Yao |
| 5,630,171 A | 5/1997 | Chejlava, Jr. et al. |
| 5,634,107 A | 5/1997 | Yumoto et al. |
| 5,638,946 A | 6/1997 | Zavracky |

(Continued)

FOREIGN PATENT DOCUMENTS

EP 1681625 A2 * 7/2006

(Continued)

OTHER PUBLICATIONS

Shimpi, Anand Lal, "NVIDIA SLI Performance Preview with MSI's nForce4 SLI Motherboard", Oct. 29, 2004, Anandtech.com, retrieved from the Internet on Dec. 4, 2007 at http://www.anandtech.com/printarticle.aspx?i=2258.*

(Continued)

*Primary Examiner*—Mark Rinehart
*Assistant Examiner*—Faisal M Zaman

(57) ABSTRACT

An apparatus and method for selectively configuring a first PCI Express connector and a second PCI Express connector. The apparatus includes a PCB (printed circuit board) having a PCI Express first connector and a PCI Express second connector mounted thereon. A translation device connector and a bridge component are also mounted on the PCB. The bridge component is coupled to the first connector, the second connector, and the translation device connector. The translation device connector is adapted to couple to a translation device in either a first orientation or a second orientation, wherein the first orientation configures the first connector for a first number of lanes and the second orientation configures the first connector and the second connector for a second number of lanes.

17 Claims, 12 Drawing Sheets

U.S. PATENT DOCUMENTS

| | | | |
|---|---|---|---|
| 5,671,376 | A | 9/1997 | Bucher et al. |
| 5,694,143 | A | 12/1997 | Fielder et al. |
| 5,766,979 | A | 6/1998 | Budnaitis |
| 5,768,178 | A | 6/1998 | McLaury |
| 5,805,833 | A | 9/1998 | Verdun |
| 5,909,595 | A | 6/1999 | Rosenthal et al. |
| 5,913,218 | A | 6/1999 | Carney et al. |
| 5,937,173 | A | 8/1999 | Olarig et al. |
| 5,956,252 | A | 9/1999 | Lau et al. |
| 5,996,996 | A | 12/1999 | Brunelle |
| 5,999,990 | A | 12/1999 | Sharrit et al. |
| 6,003,100 | A | 12/1999 | Lee |
| 6,049,870 | A | 4/2000 | Greaves |
| 6,065,131 | A | 5/2000 | Andrews et al. |
| 6,067,262 | A | 5/2000 | Irrinki et al. |
| 6,069,540 | A | 5/2000 | Berenz et al. |
| 6,072,686 | A | 6/2000 | Yarbrough |
| 6,085,269 | A | 7/2000 | Chan et al. |
| 6,094,116 | A | 7/2000 | Tai et al. |
| 6,219,628 | B1 | 4/2001 | Kodosky et al. |
| 6,255,849 | B1 | 7/2001 | Mohan |
| 6,307,169 | B1 | 10/2001 | Sun et al. |
| 6,323,699 | B1 | 11/2001 | Quiet |
| 6,363,285 | B1 | 3/2002 | Wey |
| 6,363,295 | B1 | 3/2002 | Akram et al. |
| 6,370,603 | B1 | 4/2002 | Silverman et al. |
| 6,377,898 | B1 | 4/2002 | Steffan et al. |
| 6,389,585 | B1 | 5/2002 | Masleid et al. |
| 6,392,431 | B1 | 5/2002 | Jones |
| 6,429,288 | B1 | 8/2002 | Esswein et al. |
| 6,429,747 | B2 | 8/2002 | Franck et al. |
| 6,433,657 | B1 | 8/2002 | Chen |
| 6,437,657 | B1 | 8/2002 | Jones |
| 6,486,425 | B2 | 11/2002 | Seki |
| 6,504,841 | B1 | 1/2003 | Larson et al. |
| 6,530,045 | B1 | 3/2003 | Cooper et al. |
| 6,535,986 | B1 | 3/2003 | Rosno et al. |
| 6,557,070 | B1 * | 4/2003 | Noel, Jr. .................... 710/317 |
| 6,598,194 | B1 | 7/2003 | Madge et al. |
| 6,629,181 | B1 | 9/2003 | Alappat et al. |
| 6,662,133 | B2 | 12/2003 | Engel et al. |
| 6,700,581 | B2 | 3/2004 | Baldwin et al. |
| 6,734,770 | B2 | 3/2004 | Aigner et al. |
| 6,717,474 | B2 | 4/2004 | Chen et al. |
| 6,718,496 | B1 | 4/2004 | Fukuhisa et al. |
| 6,741,258 | B1 | 5/2004 | Peck, Jr. et al. |
| 6,747,483 | B2 | 6/2004 | To et al. |
| 6,782,587 | B2 | 8/2004 | Reilly |
| 6,788,101 | B1 | 9/2004 | Rahman |
| 6,794,101 | B2 | 9/2004 | Liu et al. |
| 6,806,788 | B1 | 10/2004 | Marumoto |
| 6,823,283 | B2 | 11/2004 | Steger et al. |
| 6,825,847 | B1 | 11/2004 | Molnar et al. |
| 6,849,924 | B2 | 2/2005 | Allison et al. |
| 6,850,133 | B2 | 2/2005 | Ma |
| 6,879,207 | B1 | 4/2005 | Nickolls |
| 6,938,176 | B1 | 4/2005 | Alben et al. |
| 6,924,986 | B1 * | 8/2005 | Sardella et al. ............. 361/785 |
| 6,956,579 | B1 | 10/2005 | Diard et al. |
| 6,982,718 | B2 | 1/2006 | Kilgard et al. |
| 7,020,598 | B1 | 3/2006 | Jacobson |
| 7,069,369 | B2 | 6/2006 | Chou et al. |
| 7,075,542 | B1 | 7/2006 | Leather |
| 7,085,824 | B2 | 8/2006 | Forth et al. |
| 7,136,953 | B1 | 11/2006 | Bisson et al. |
| 7,174,407 | B2 | 2/2007 | Hou et al. |
| 7,174,411 | B1 * | 2/2007 | Ngai .......................... 710/316 |
| 7,174,412 | B2 * | 2/2007 | Lin ............................ 710/316 |
| 7,185,135 | B1 | 2/2007 | Briggs et al. |
| 7,187,383 | B2 | 3/2007 | Kent |
| 7,209,987 | B1 * | 4/2007 | Schneider et al. .......... 710/104 |
| 7,248,470 | B2 * | 7/2007 | Chen et al. ............. 361/679.41 |
| RE39,898 | E | 10/2007 | Nally et al. |
| 7,293,127 | B2 | 11/2007 | Caruk |
| 7,305,571 | B2 | 12/2007 | Cranford, Jr. et al. |
| 7,340,541 | B2 | 3/2008 | Castro et al. |
| 7,412,554 | B2 * | 8/2008 | Danilak ...................... 710/305 |
| 7,424,564 | B2 * | 9/2008 | Mehta et al. ................ 710/301 |
| 7,461,195 | B1 * | 12/2008 | Woodral ..................... 710/313 |
| 7,480,757 | B2 * | 1/2009 | Atherton et al. ............. 710/313 |
| 7,480,808 | B2 | 1/2009 | Caruk et al. |
| 7,525,986 | B2 | 4/2009 | Lee et al. |
| 7,539,809 | B2 * | 5/2009 | Juenger ...................... 710/307 |
| 2002/0005729 | A1 | 1/2002 | Leedy |
| 2002/0026623 | A1 | 2/2002 | Morooka |
| 2002/0158869 | A1 | 10/2002 | Ohba et al. |
| 2003/0020173 | A1 | 1/2003 | Huff et al. |
| 2003/0046472 | A1 | 3/2003 | Morrow |
| 2003/0051091 | A1 | 3/2003 | Leung et al. |
| 2003/0061409 | A1 | 3/2003 | RuDusky |
| 2003/0093506 | A1 | 5/2003 | Oliver et al. |
| 2003/0115500 | A1 | 6/2003 | Akrout et al. |
| 2003/0164830 | A1 | 9/2003 | Kent |
| 2004/0012597 | A1 | 1/2004 | Zatz et al. |
| 2004/0064628 | A1 | 4/2004 | Chiu |
| 2004/0085313 | A1 | 5/2004 | Moreton et al. |
| 2004/0102187 | A1 | 5/2004 | Moller et al. |
| 2004/0183148 | A1 | 9/2004 | Blasko, III |
| 2004/0188781 | A1 | 9/2004 | Bar |
| 2004/0227599 | A1 | 11/2004 | Shen et al. |
| 2005/0041031 | A1 | 2/2005 | Diard |
| 2005/0045722 | A1 | 3/2005 | Park |
| 2005/0060601 | A1 | 3/2005 | Gomm |
| 2005/0173233 | A1 | 3/2005 | Gomm |
| 2005/0088445 | A1 * | 4/2005 | Gonzalez et al. ............ 345/502 |
| 2005/0102454 | A1 * | 5/2005 | McAfee et al. .............. 710/107 |
| 2005/0104623 | A1 | 5/2005 | Guo et al. |
| 2005/0114581 | A1 * | 5/2005 | Azadet et al. ............... 710/305 |
| 2005/0240703 | A1 * | 10/2005 | Nguyen et al. ............. 710/301 |
| 2005/0285863 | A1 | 12/2005 | Diamond |
| 2006/0055641 | A1 | 3/2006 | Robertus et al. |
| 2006/0067440 | A1 | 3/2006 | Hsu et al. |
| 2006/0098020 | A1 * | 5/2006 | Shen et al. .................. 345/520 |
| 2006/0106911 | A1 * | 5/2006 | Chapple et al. ............. 709/200 |
| 2006/0123177 | A1 | 6/2006 | Chan et al. |
| 2006/0168377 | A1 * | 7/2006 | Vasudevan et al. .......... 710/104 |
| 2006/0221086 | A1 | 10/2006 | Diard |
| 2006/0252285 | A1 | 11/2006 | Shen |
| 2006/0267981 | A1 | 11/2006 | Naoi |
| 2006/0267987 | A1 | 11/2006 | Litchmanov |
| 2006/0282604 | A1 | 12/2006 | Temkine et al. |
| 2007/0038794 | A1 | 2/2007 | Purcell et al. |
| 2007/0067535 | A1 | 3/2007 | Liu |
| 2007/0088877 | A1 | 4/2007 | Chen et al. |
| 2007/0094436 | A1 * | 4/2007 | Keown et al. ............... 710/307 |
| 2007/0115271 | A1 | 5/2007 | Seo et al. |
| 2007/0115291 | A1 | 5/2007 | Chen et al. |

FOREIGN PATENT DOCUMENTS

| | | |
|---|---|---|
| EP | 1681632 A2 * | 7/2006 |
| EP | 1691271 A1 * | 8/2006 |
| GB | 2422928 A * | 8/2006 |
| JP | 2006195821 A * | 7/2006 |
| JP | 2007280237 A * | 10/2007 |
| TW | 093127712 | 7/2005 |
| WO | 2005029329 | 3/2005 |

OTHER PUBLICATIONS

Altavilla, Dave, "NVIDIA SLI & ASUS A8N-SLI Deluxe Performance Showcase", Dec. 8, 2004, Hothardware.com, retrieved from the Internet on Dec. 4, 2007 at http://hothardware.com/printarticle.aspx?articleid=612.*

Bell, Brandon, "nForce4 SLI Performance Preview", Nov. 23, 2004, FiringSquad.com, retrieved from the Internet on Dec. 4, 2007 at http://www.firingsquad.com/hardware/nvidia_nforce_4_sli/page3.asp.*

Davis, Leroy, "PCI-Express 8x Connector Pin Out", Jul. 12, 2008, retrieved from the Internet on Mar. 23, 2009 at http://www.interfacebus.com/Design_PCI_Express_8x_PinOut.html.*

Won-ok Kwon et al., "PCI Express multi-lane de-skew logic design using embedded SERDES FPGA," 7th International Conference on Solid-State and Integrated Circuits Technology, Oct. 2004, IEEE, vol. 3, pp. 2035-2038.*

Qiang Wu Jiamou Xu Xuwen Li Kebin Jia, "The Research and Implementation of Interfacing Based on PCI Express", Aug. 2009, IEEE, The Ninth International Conference on Electronic Measurement and Instruments, pp. 116-121.*

Kim et al., "A Dual PFD Phase Rotating Multi-Phase PLL for 5Gbps PCI Express Gen2 Multi-Lane Serial Link Receiver in 0.13um CMOS," Oct. 2007, IEEE Symposium on VLSI Circuits, IEEE, pp. 234-235.*

Welch, D. "Building Self-Reconfiguring Distributed Systems Using Compensating Reconfiguration", Proceedings Fourth International Journal Conference on Configurable Distributed Systems, May 4-6, 1998, pp. 18-25.

Eckert, et al; Functional Component Coordinated Reconfiguration System and Method; U.S. Appl. No. 11/454,313; Filing date: Jun. 16, 2006.

Diamond, A Semiconductor Die Micro Electro-Mechanical Switch Management System; U.S. Appl. No. 10/942,209; Filing Date: Sep. 15, 2004.

Diamond, et al; A System and Method for Remotely Configuring Semiconductor Functional Circuits; U.S. Appl. No. 10/740,779; Filing date: Dec. 18, 2003.

Van Dyke, et al; A System and Method for Increasing Die Yield; U.S. Appl. No. 10/740,723, Filing Date: Dec. 18, 2003.

Diamond, A System and Method for Configuring Semiconductor Functional Circuits; U.S. Appl. No. 10/740,722; Filing date: Dec. 18, 2003.

Van Dyke, et al; An Integrated Circuit Configuring System and Method; U.S. Appl. No. 10/740,721; Filing Date: Dec. 18, 2003.

Diamond; Micro Electro Mechanical Switch System and Method for Testing and Configuring Semiconductor Functional Circuits; U.S. Appl. No. 10/942,169; Filing Date: Sep. 15, 2004.

Diamond; A System and Method for Configuring Semiconductor Functional Circuits; U.S. Appl. No. 10/876,340; Filing Date: Jun. 23, 2004.

International Search Report. PCT/US2004/030127. Mail Date Jun. 30, 2005.

PCT International Preliminary Report on Patentability. PCT/US2004/030127. International Filing Date Sep. 13, 2004. Applicant: Nvidia Corporation. Date of Issuance of this Report: Mar. 16, 2006.

European Patent Office E-Space Family List for: WO 2005/29329 (PCT/US 2004/030127).

Zimmermann, "OSI Reference Model - The ISO Model of Architecture for Open Systems Interconnection, " IEEE Transactions on Communications, Apr. 1980.

Richard Shoup, "Superpaint: An Early Frame Buffer Graphics System," IEEE Annals of the History of Computing, copyright 2001.

Kuroda et al., "Multimedia Processors," Proceedings of the IEEE, Jun. 1998.

PCI Express Card Electromechanical Specification Rev. 1.1, 2005, p. 87.

* cited by examiner

TRANSLATION DEVICE APPARATUS FOR CONFIGURING PRINTED CIRCUIT BOARD CONNECTORS

FIELD OF THE INVENTION

The present invention is generally related to high performance bus interconnects for computer systems.

BACKGROUND OF THE INVENTION

A computer system's bus conveys all the information and signals involved in the system's operation. Generally, one or more busses are used to connect a CPU (central processing unit) to a system memory and to the input/output components so that data and control signals can readily be transmitted between these different components. Expansion devices are connected to the computer system and its CPU via the bus structure. Hence, the bus structure is critical to the overall performance of the computer system. A bandwidth constrained, high latency bus architecture acts as a bottleneck which slows down the overall performance of the computer system, regardless of the performance of the expansion devices coupled to the computer system or CPU's speed and power.

Typical computer system operations often require the efficient transfer of large blocks of data. Such transfers are especially prevalent for bandwidth hungry devices, such as, for example, 3D GPU (graphics processor unit) cards, full motion video adapters, Ethernet host bus adapters, FDDI devices, etc. In addition to the speed requirements of the hardware devices, popular software applications prevalent today demand extremely fast updates of graphic and video images (e.g., moving or resizing multiple video windows) without imposing unacceptable system "stuttering" or delays on the end user. Such real-time graphics manipulation requires the updating and moving of large blocks of data (e.g., between system memory, graphics memory, etc.). Hence, an efficient bus architecture is an important element in determining the computer system's overall performance.

PCI Express comprises a high-speed peripheral interconnect architecture first introduced in 2002. PCI Express is intended to eventually replace the earlier developed PCI and AGP bus standards. The objective of PCI Express was to accommodate the higher speeds of the increasingly powerful CPUs, GPUs, and high performance I/O devices (e.g., Gigabit and 10 Gigabit Ethernet, etc.).

PCI Express is based on a high-speed, switched architecture, as opposed to the shared, parallel bus structure of the earlier AGP and PCI standards. Each PCI Express link, or lane, is a serial communications channel made up of two differential signaling wire pairs that provide 2.5 Gb/sec of communications bandwidth in each direction. In a high performance implementation, up to 32 of these "lanes" may be combined in x1, x2, x4, x8, and x16 configurations, creating a parallel interface of independently controlled serial links. The bandwidth of the switch backplane (e.g., the motherboard) is one factor that determines the total capacity of a PCI Express implementation.

The number of PCIe lanes is typically dictated by cost constraints. For example, a 4-layer PCB (printed circuit board) is less expensive than a 6, 8 (or greater number) layer PCB. As such, flexibility considerations in having a large number of PCIe lanes cannot overshadow practical cost considerations. For example, an additional number of PCIe lanes somewhere beyond about 20 starts causing trace routing problems (e.g., not enough space to adequately route the traces) for 4-layer, and potentially 6- and 8-layer motherboards. So having 28 lanes presents a much more difficult trace routing problem, which includes the difficulty in physically "breaking out" of the BGA package, also known as "pin escaping". Such considerations as cause the industry standard x86 architecture to coalesce around PCIe implementations having 20 lanes.

A problem exist however, in the standardized configuration of the chipset architectures of mass-produced computer systems (e.g., industry standard x86 machines). As described above, the majority of industry standard x86 chipsets are built around a switch backplane supporting a total capacity of 20 PCI Express lanes. The chipsets employ one "x16" PCI Express connector for the bandwidth hungry graphics subsystem (e.g., an add-in PCI Express GPU card), and four "x1" connectors for I/O devices (e.g., Ethernet, etc.). The problem, however, is that there are many emerging applications that greatly benefit from two high bandwidth connections to the computer system as opposed to one x16 connection.

Two high bandwidth connections would allow the use of two high performance, high bandwidth devices. However, the majority of the x86 chipsets do not implement two high bandwidth PCI Express connectors. The trace routing constraints, signal quality constraints, multi-layer PCB manufacturing costs, etc., render the simple addition of an extra x16 PCI Express connector to the motherboard problematic. Additionally, there are a limited number of connectors available on a typical industry standard motherboard (e.g., ATX motherboard, etc.). Thus, a need exists for an efficient way to flexibly accommodate two high bandwidth PCI Express connectors on a motherboard.

SUMMARY OF THE INVENTION

Embodiments of the present invention provide an efficient way to flexibly accommodate two high bandwidth PCI Express connectors on a motherboard. Embodiments of the present invention enable the flexible provision of two high bandwidth connections that enable the use of two high performance, high bandwidth devices, such as, for example, GPU cards, while maintaining the economies of scale associated with the established industry standard x86 architecture chipsets.

In one embodiment, the present invention is implemented as a PCB apparatus (e.g., motherboard) that can selectively configure a first PCI Express connector and a second PCI Express connector, of its provided set of PCI Express connectors (e.g., 3, 4, or more). The PCB has a translation device connector and a bridge component mounted thereon. The bridge component provides PCI Express bus communication functionality for the computer system. The bridge component is coupled to the first connector, the second connector, and the translation device connector. The translation device connector is adapted to couple to a translation device which is inserted into the translation device connector in either a first orientation (e.g., front edge) or a second orientation (e.g., back edge). The first orientation configures the first connector for a first number of lanes (e.g., 16 PCI Express lanes) and the second orientation configures the first connector and the second connector for a second number of lanes (e.g., 8 PCI Express lanes for both the first and second connectors).

In this manner, two high bandwidth PCI Express connections are flexibly accommodated while limiting the impact on PCB fabrication costs, such trace routing requirements, signal quality constraints, and the like. In one embodiment, for those applications that only require a single high bandwidth connection, the apparatus can use one of the two PCI Express connectors as a 16 lane connector. Applications that require two high bandwidth connectors can be similarly accommodated through the configuration for two 8 lane connectors.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
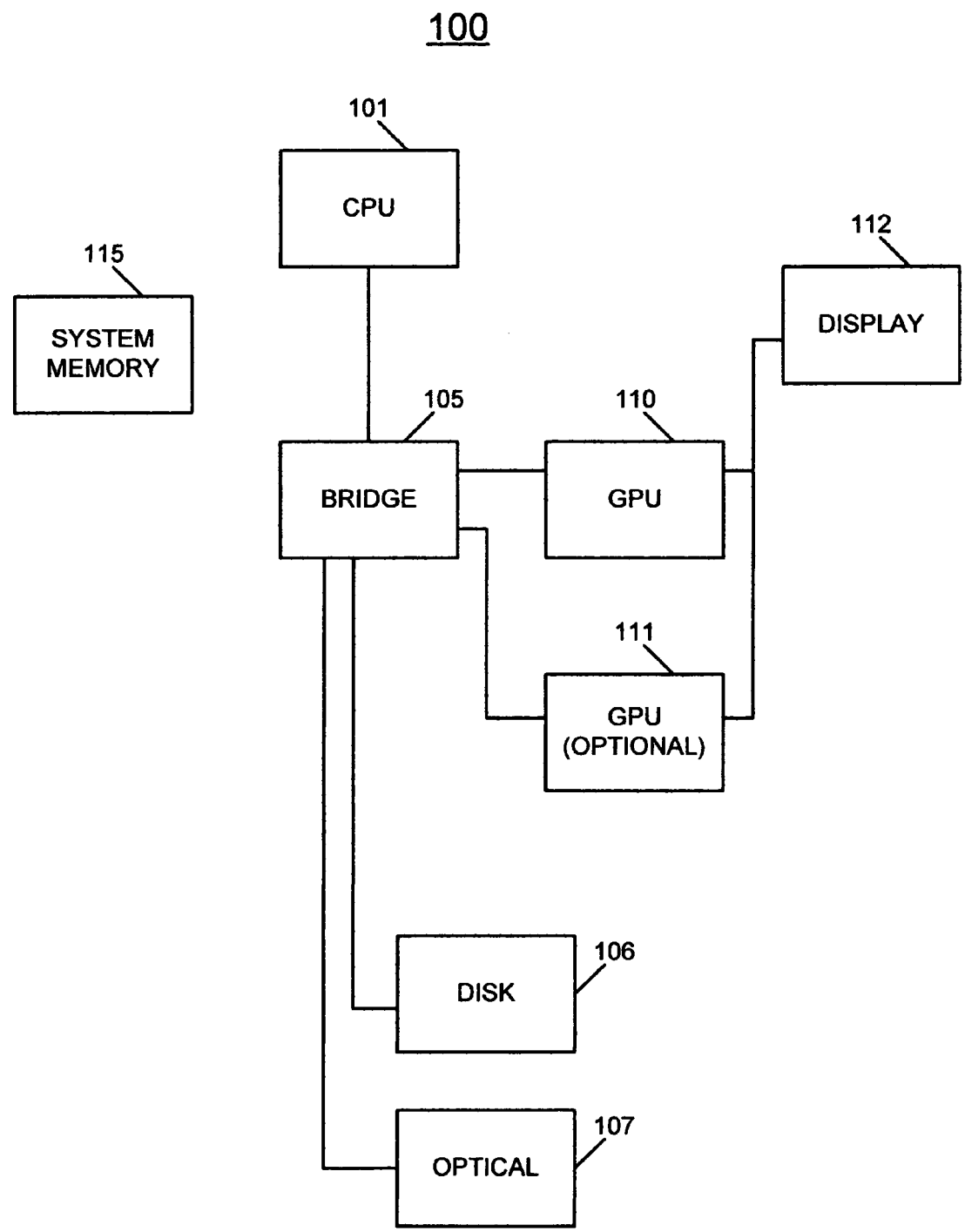
FIG. 1 shows the basic components of a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via the bridge component 105 or can be directly coupled to the system memory 115 via a memory controller internal to the CPU 101. The GPU 110 is coupled to a display 112. System 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, IO devices, and the like. One or more additional GPU's (e.g., GPU 111) can optionally be coupled to system 100 to further increase its computational power. The GPU(s) are coupled to the CPU 101 and the system memory 115 via the bridge component 105 (the Southbridge in this example, but could also be the "Northbridge"). The bridge component 105 also supports expansion buses coupling a disk subsystem 106 (e.g., one or more hard disk drives) an optical subsystem 107 (e.g., CD ROM, DVD, etc.). In one embodiment, the connections to the GPU(s), disk subsystem 106, optical subsystem 17, and the like are PCI Express connections.

It should be appreciated that although the GPU 110 and the optional GPU 111 are depicted in FIG. 1 as a discrete component, the GPU(s) can be implemented as a discrete graphics card(s) designed to couple to the computer system via a PCI Express connection, as a discrete integrated circuit dies (e.g., mounted directly on the motherboard), or as an integrated GPU included within the integrated circuit die of a computer system chipset component (e.g., one of the GPUs integrated within the bridge chip 105). Additionally, a local graphics memory can be included for the GPU(s) 110 for high bandwidth graphics data storage. It also should be noted that although the bridge component 105 is depicted as a discrete component, the bridge component 105 can be implemented as an integrated controller within a different component (e.g., within the CPU 101, GPU 110, etc.) of the computer system 100. Similarly, system 100 can be implemented as a set-top video game console device such as, for example, the Xbox®, available from Microsoft Corporation of Redmond, Wash.

Embodiments of the Invention

Figure 2:
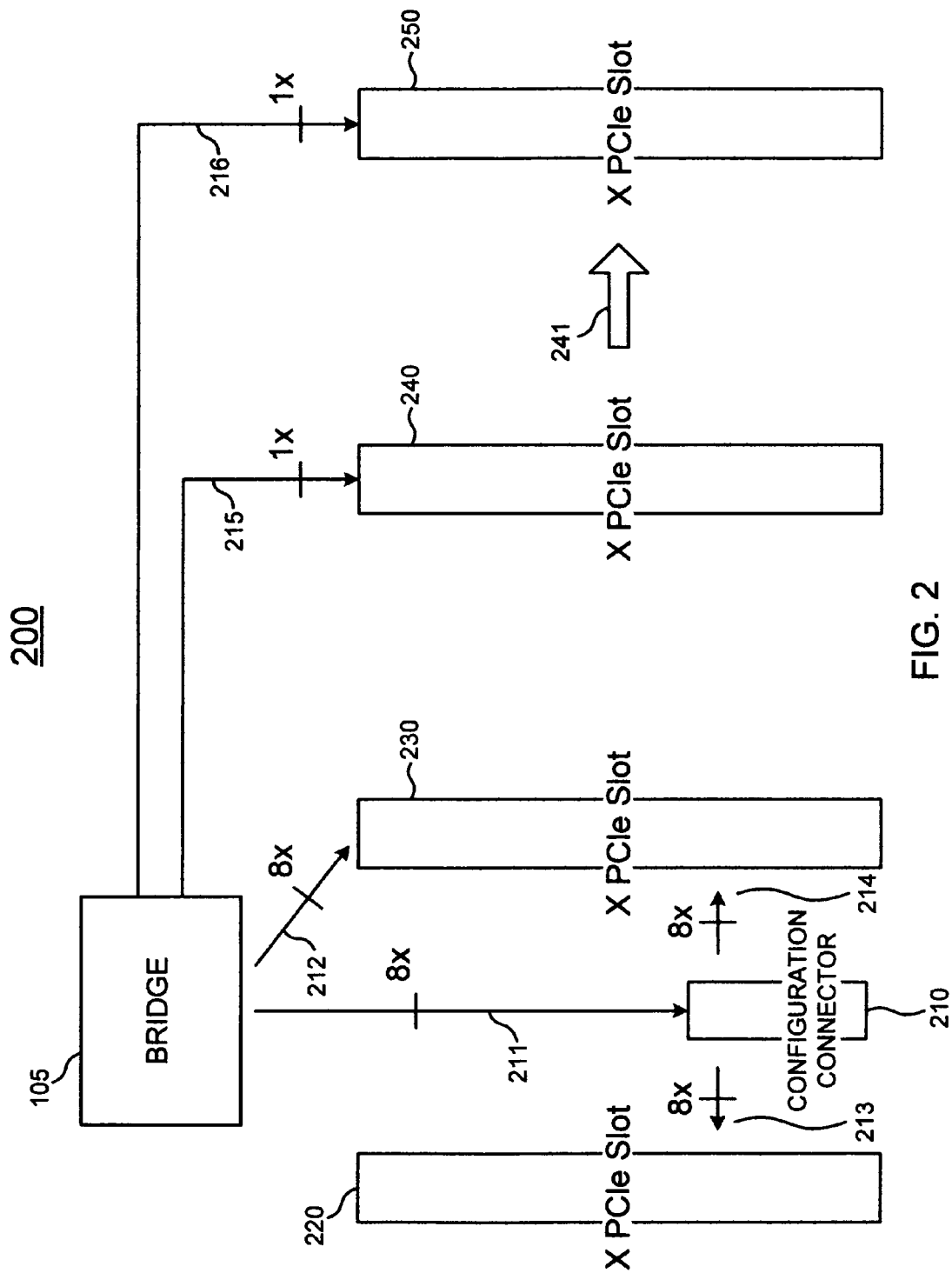
FIG. 2 shows a diagram of a printed circuit board in accordance with one embodiment of the present invention.

FIG. 2 shows a diagram of a printed circuit board 200 in accordance with one embodiment of the present invention. As depicted in FIG. 2, the printed circuit board 200 includes the bridge component 105, a configuration connector 210, and a plurality of PCI Express slots/connectors (e.g., slots 220, 230, etc.).

The printed circuit board 200 of the present embodiment comprises a motherboard of a computer system (e.g., x86 industry-standard computer system). The bridge component 105 provides the bus connections between the computer system CPU (e.g., CPU 101), the system memory (e.g., system memory 115), and the various devices coupled to the PCI Express connectors (e.g., GPU 110, etc.). In the present embodiment, the bridge component 105 includes PCI Express functionality and the bus connections are PCI Express based connections.

The print circuit board 200, hereafter motherboard 200, of the FIG. 2 embodiment provides an efficient way to flexibly accommodate two high bandwidth PCI Express connectors on the motherboard, thereby enabling the provision of two high bandwidth connections for two high performance, high bandwidth devices, such as, for example, the GPUs 110 and 111 shown in FIG. 1. Importantly, the motherboard 200 embodiment flexibly routes available bandwidth (e.g., the total number of PCI Express lanes supported) to pre-existing PCI Express connections (e.g., PCI Express connection 220 and PCI Express connection 230) without requiring the addition of separate a dedicated high bandwidth PCI Express connection, thereby maintaining the economies of scale associated with the mass-produced industry standard x86 architecture chipsets.

The motherboard 200 embodiment of FIG. 2 shows the configuration connector 210, or "translation device connector", mounted on the PCB. The configuration connector 210 is coupled to the bridge component 105 through traces of the motherboard 200 (e.g., signal traces on one or more layers of the multilayer PCB comprising motherboard 200). The configuration connector 210 is similarly coupled to a first connector, PCI Express connector 220, and a second connector, PCI Express connector 230. A number of additional PCI Express slots/connectors can be mounted to the motherboard 200, as represented by the arrow 241.

The configuration connector 210 is adapted to receive a removable translation device (shown in FIG. 4 below). In the present embodiment, the translation device "fits" into the configuration connector 210 in one of two orientations. When inserted, the first orientation or the second orientation electrically closes and opens certain signal traces within the configuration connector 210, thereby electronically configuring the PCI Express functionality of the coupled PCI Express connectors 220 and 230.

For example, in the present embodiment, when the removable translation device is fitted into the configuration connector 210 in the first orientation, a first number of PCI Express communication lanes are dedicated to the PCI Express connector 230. This configuration would typically route 16 PCI Express lanes to the PCI Express connector 230. In the present embodiment, the PCI Express connector 220 would be inactive in such a configuration. When the removable translation device is fitted into the configuration connector 210 in the second orientation, a second number of PCI Express communication lanes are dedicated to the PCI Express connector 230 and the second number of PCI Express communication lanes are dedicated to the PCI Express connector 220. This configuration would typically route 8 PCI Express lanes to the PCI Express connector 220 and 8 PCI Express lanes to the PCI Express connector 230. In this manner, the present motherboard 200 embodiment can either route a full 16 lanes to one connector, or half of that bandwidth, 8 lanes, to each of two connectors.

In this manner, the first orientation routes 16 lanes between the bridge component 105 and the connector 230, and the second orientation routes 8 lanes between the bridge component 105 and the connector 230 and routes 8 lanes between the bridge component 105 and the connector 220. This is shown in FIG. 2 by 8 PCI Express lanes 212 being routed via the motherboard to the connector 230 and 8 PCI Express lanes 211 being routed to the configuration connector 210, and then the 8 lanes 214 from the configuration connector 210 to the connector 230 (e.g., the first orientation). In the second orientation, the 8 lanes 211 are routed via the configuration connector 210 as the 8 lanes 213 for the connector 220.

It should be noted that although in the two connector high bandwidth configuration, each connector may have only 8 lanes as opposed to a full 16 lanes, 8 PCI Express lanes still provide a very high bandwidth connection in comparison to earlier AGP based connections. Each PCI Express lane comprises a serial communications channel made up of two differential signaling wire pairs that provide 2.5 Gb/sec in each direction. Eight lanes thus provide a high bandwidth connection supporting 20 Gb/sec in each direction. The remaining PCI Express connectors (e.g., connectors 240 and 250) would be supported by respective one lane connections (e.g., connections 215 and 216).

Figure 3:
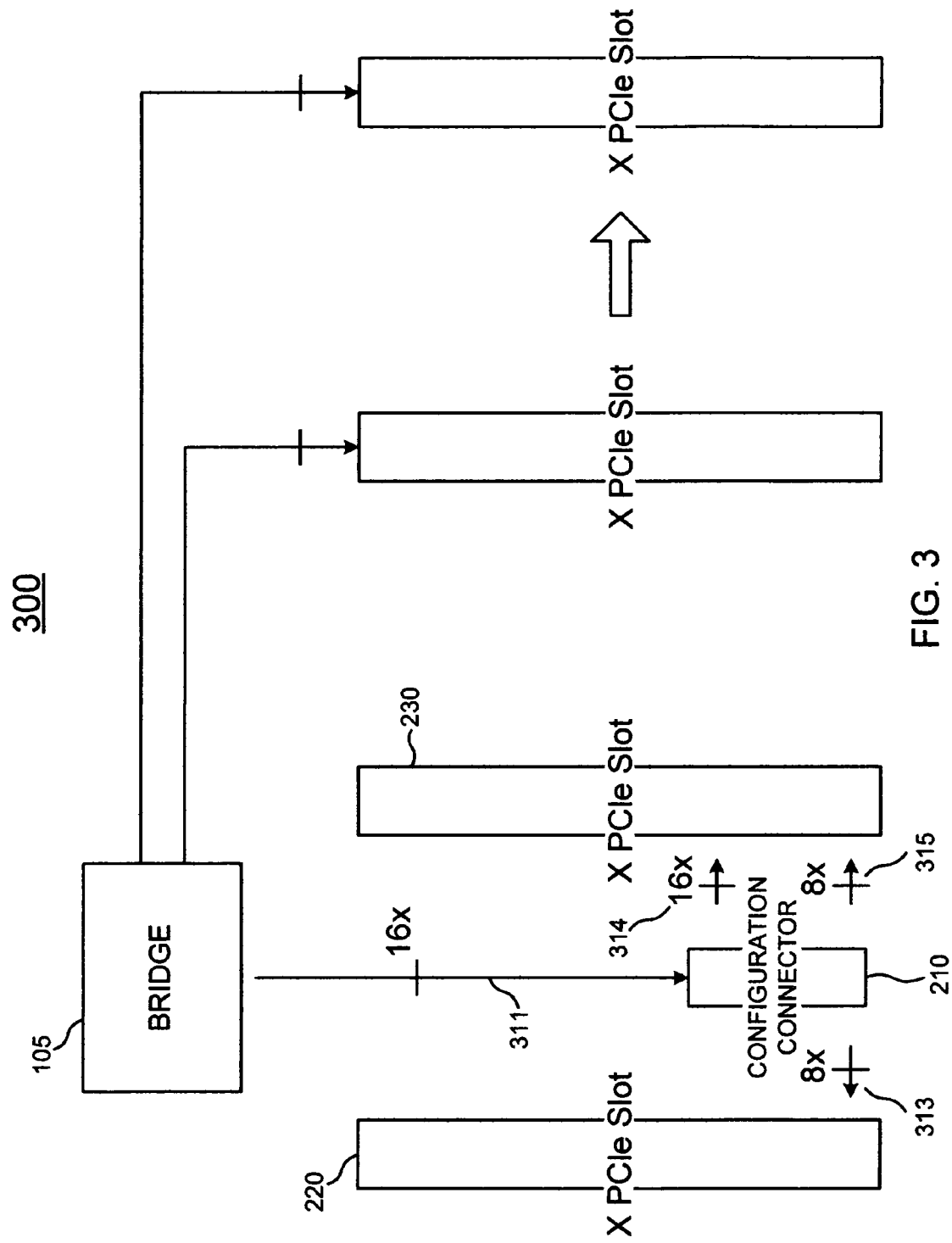
FIG. 3 shows a diagram of a printed circuit board in accordance with an alternative embodiment of the present invention.

FIG. 3 shows a diagram of a printed circuit board 300 in accordance with an alternative embodiment of the present invention. As depicted in FIG. 3, the printed circuit board 300 includes the bridge component 105, the configuration connector 210, and a plurality of PCI Express slots/connectors (e.g., slots 220, 230, etc.). In this embodiment, 16 lanes are routed directly to the configuration connector 210. The first orientation of the translation device being fit into the configuration connector 210 would route all 16 lanes (e.g., lanes 311) from the bridge component 105 to the connector 230 (e.g., lanes 314). The second orientation of the translation device would route eight of the 16 lanes 311 to the connector 220 (e.g., lanes 313) and eight of the 16 lanes to the connector 230 (e.g., lanes 315). Thus, in such an embodiment, with either orientation, all 16 lanes 311 from the bridge component 105 pass through the configuration connector 210 for subsequent routing.

Figure 4:
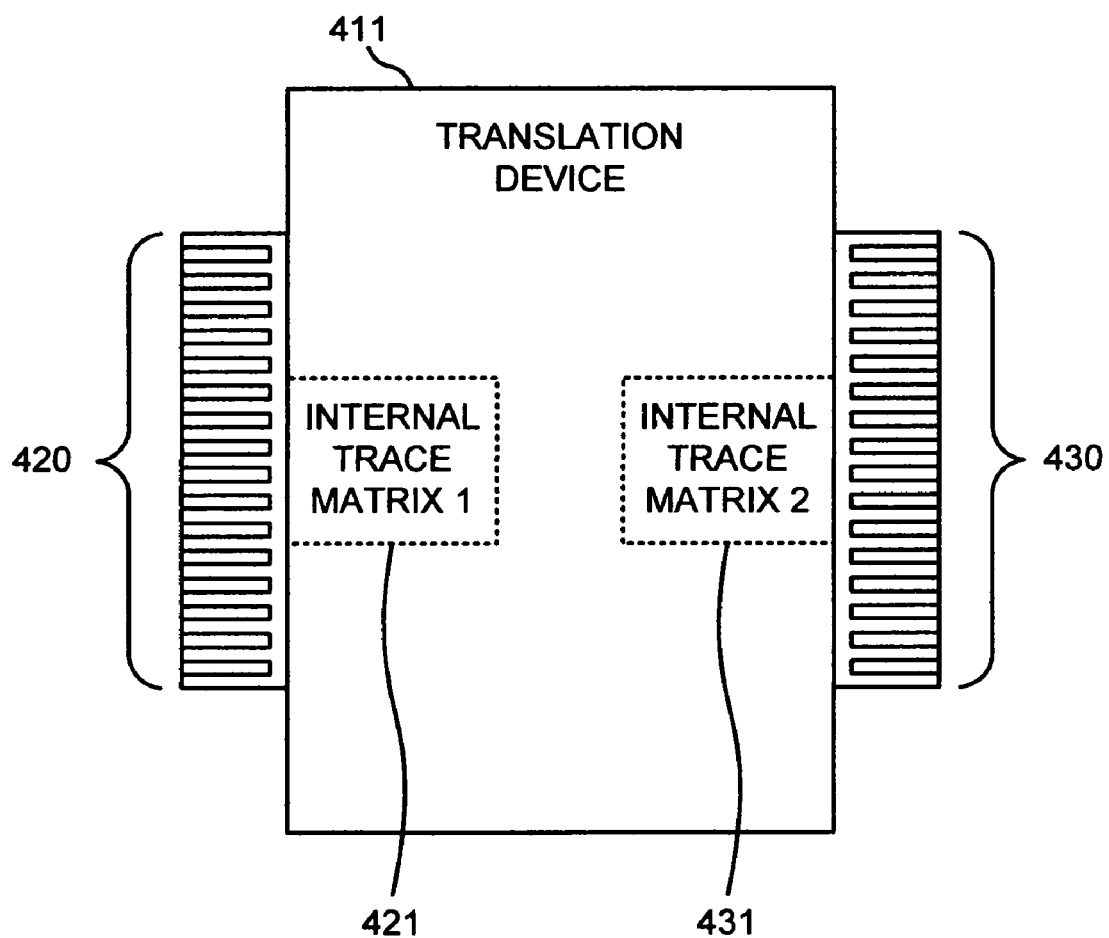
FIG. 4 shows a diagram of a translation device in accordance with one embodiment of the present invention.

FIG. 4 shows a diagram of a translation device 400 in accordance with one embodiment of the present invention. As depicted in FIG. 4, the translation device 400 comprises a substrate 411 having a first edge connector 420 and a second edge connector 430 on the side opposite the edge connector 420.

The translation device 400 is configured to fit into the configuration connector 210 (e.g., shown in FIGS. 2 and 3) in one of two possible orientations. For example, the first orientation would involve inserting the translation device 400 into the configuration connector 210 such that the edge connector 420 fits into the configuration connector 210. The second orientation would involve inserting the translation device 400 into the configuration connector 210 such that the edge connector 430 fits into the configuration connector 210. In this manner, the motherboard 100 can be configured for dual or single high bandwidth PCI Express connections by inserting the translation device 400 either "backwards" or "forwards" into the configuration connector 210.

In the present embodiment, the routing of the electronic traces (e.g., traces 211, traces 311, etc.) through the configuration connector 210, when the translation device 400 is inserted, is accomplished by routing matrices internal to the substrate 411. As shown in FIG. 4, the edge connector 420 has its own dedicated internal trace routing matrix 421 and the edge connector 430 has its own dedicated internal trace routing matrix 431. The routing matrices implement the communications pathways in conjunction with the configuration connector 410 in order to configure the connectors 220 and 230 for their appropriate number of PCI Express lanes. Additionally, the use of a substrate and trace fabrication methodology, which are widespread PCB manufacturing techniques, for the construction of the translation device 400 ensures the exceptional signal quality control characteristics of the traces.

Figure 5:
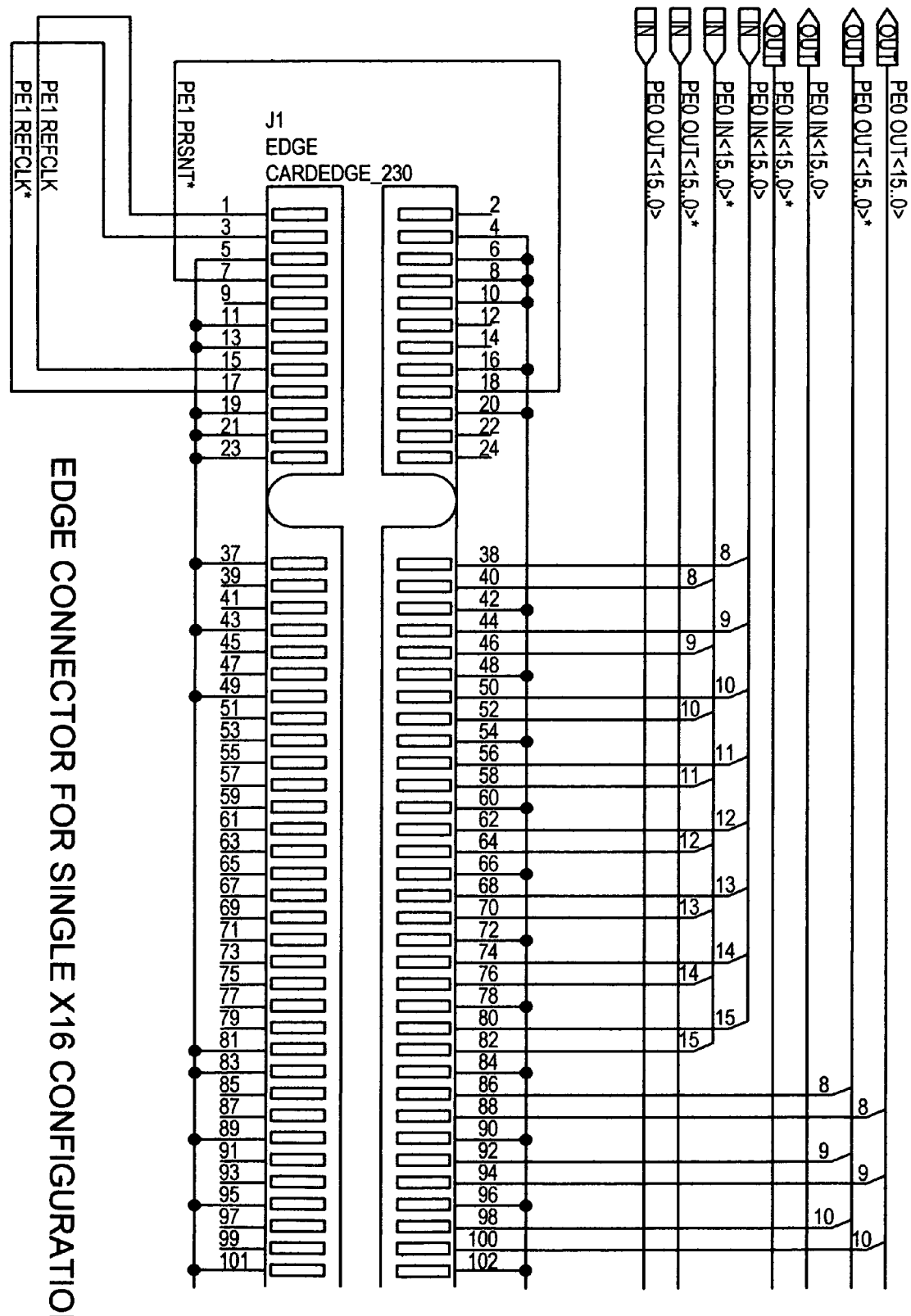
FIG. 5 shows a diagram depicting a pin-out configuration of a first edge connector on a translation device in accordance with one embodiment of the present invention.
Figure 5:
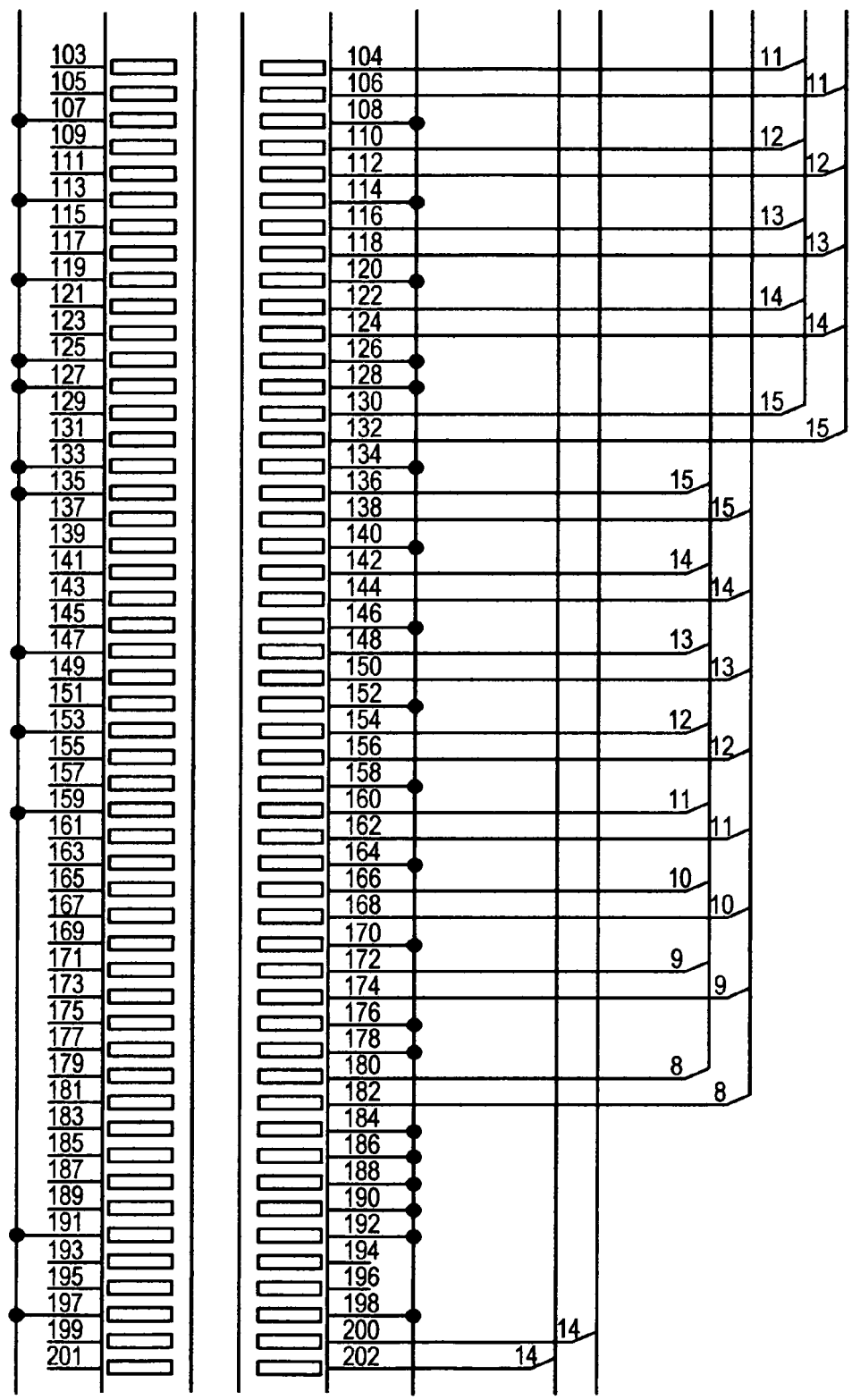
Figure 5:
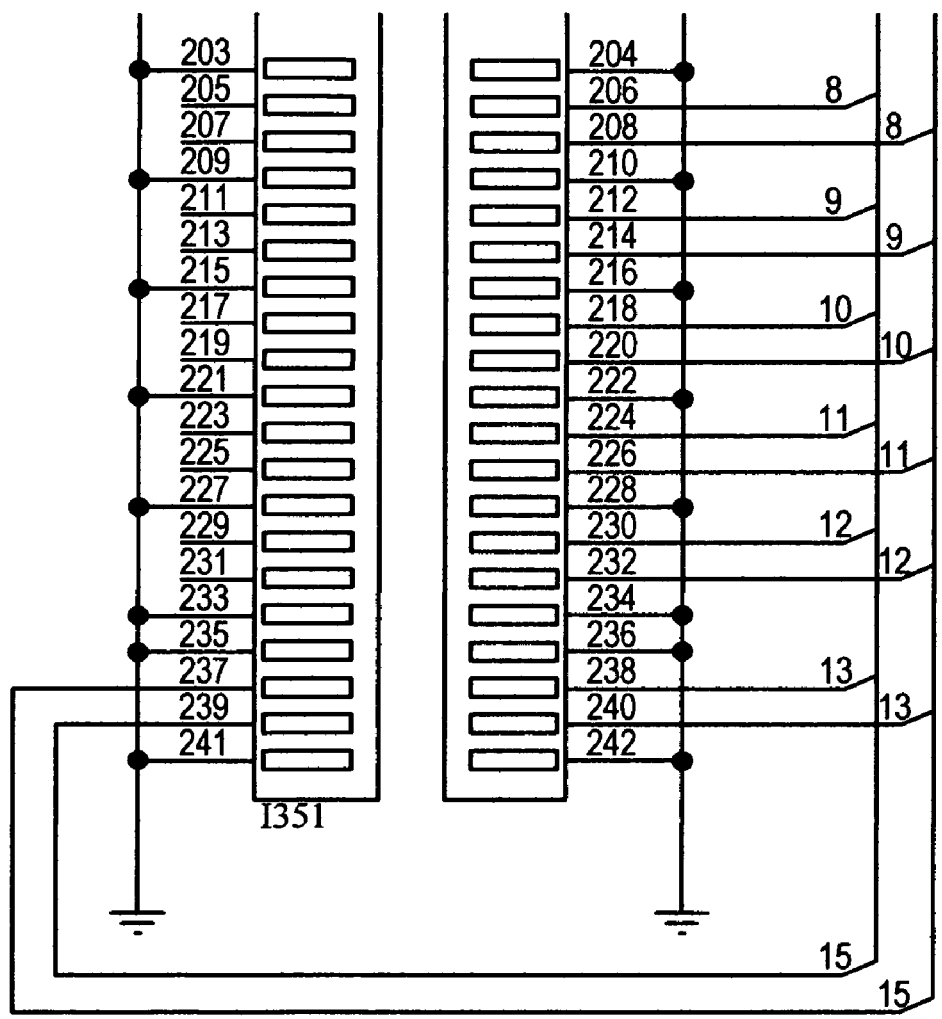
Figure 6:
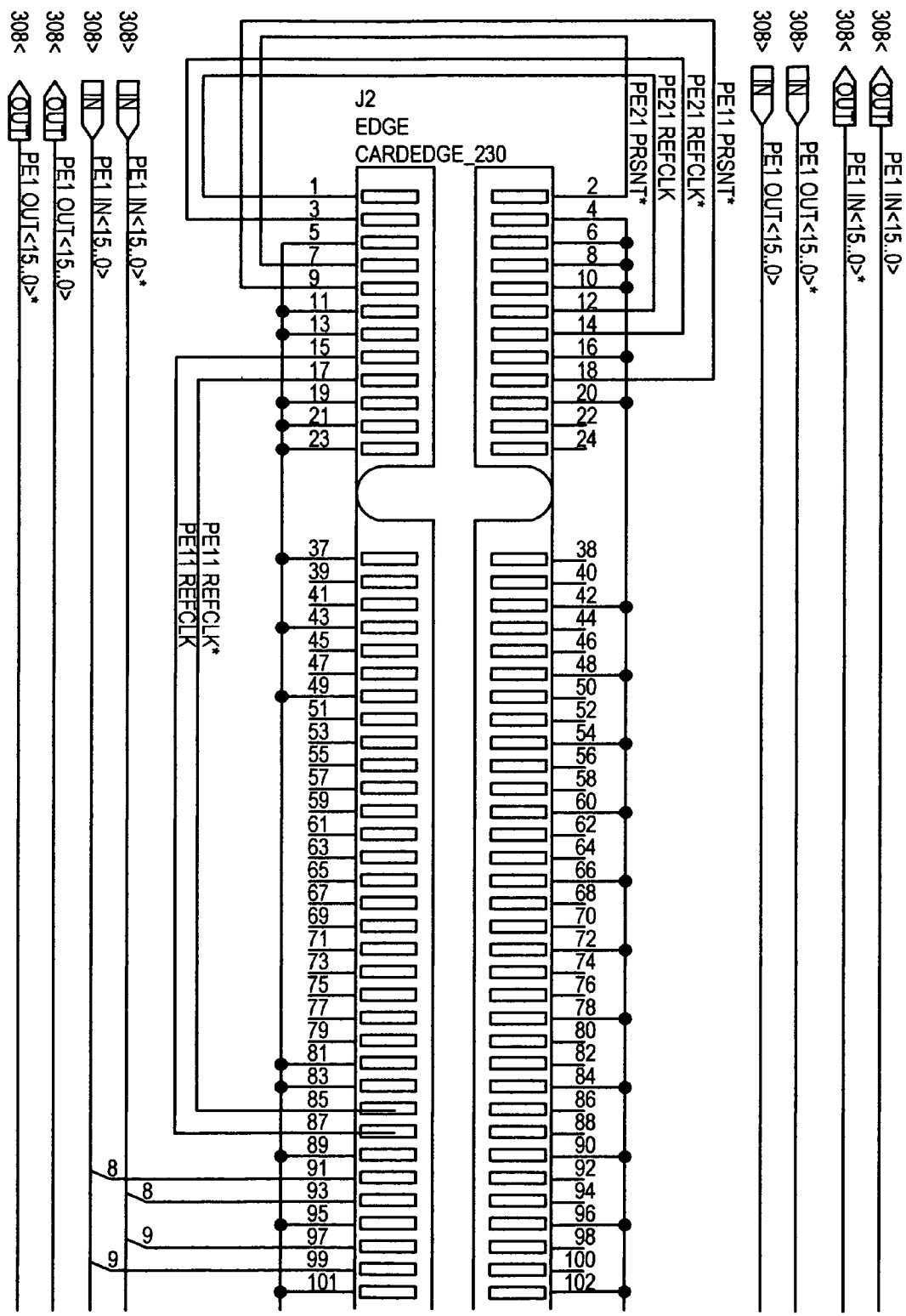
FIG. 6 shows a diagram depicting a pin-out configuration of a second edge connector on a translation device in accordance with one embodiment of the present invention.
Figure 6:
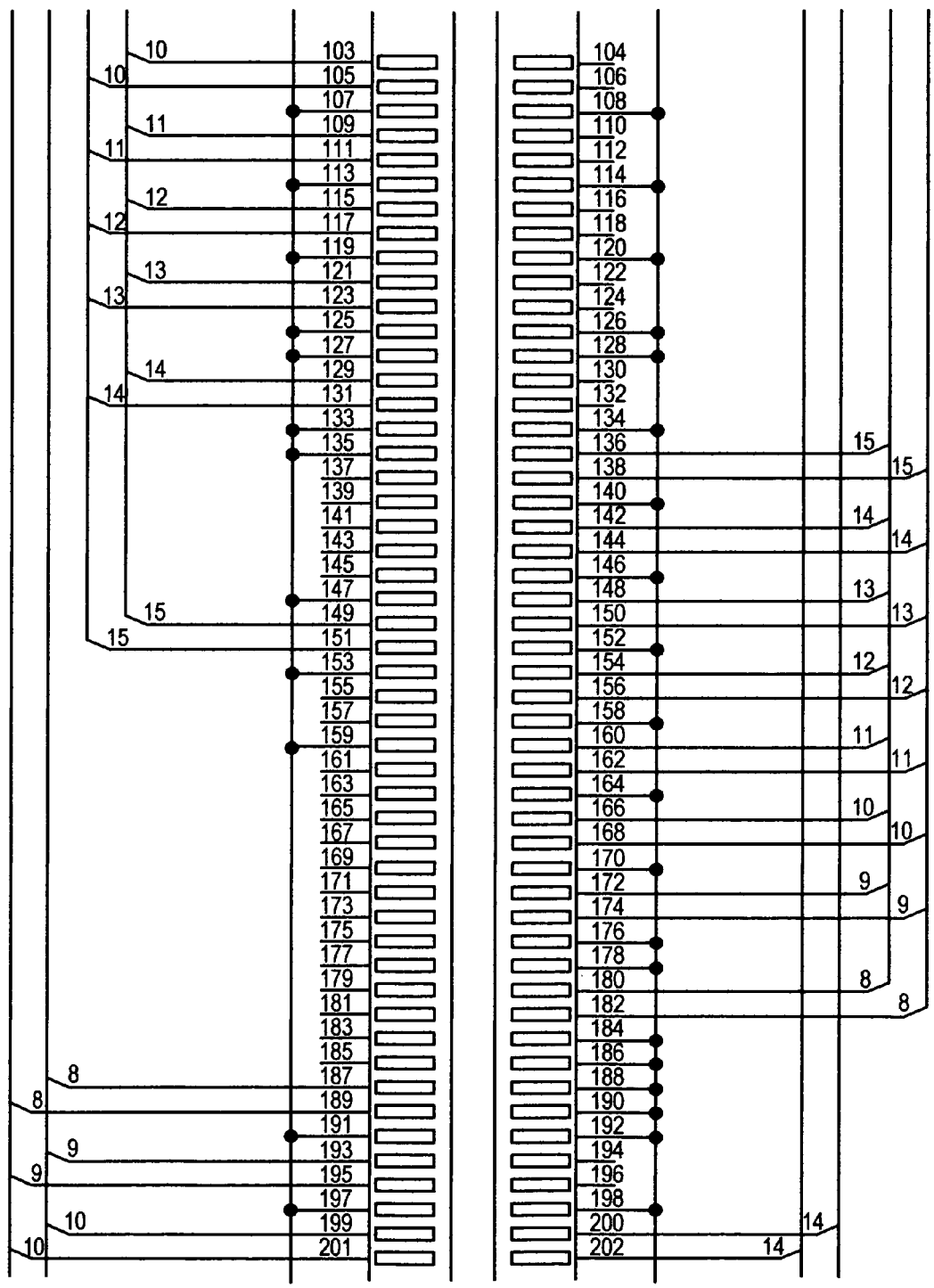
Figure 6:
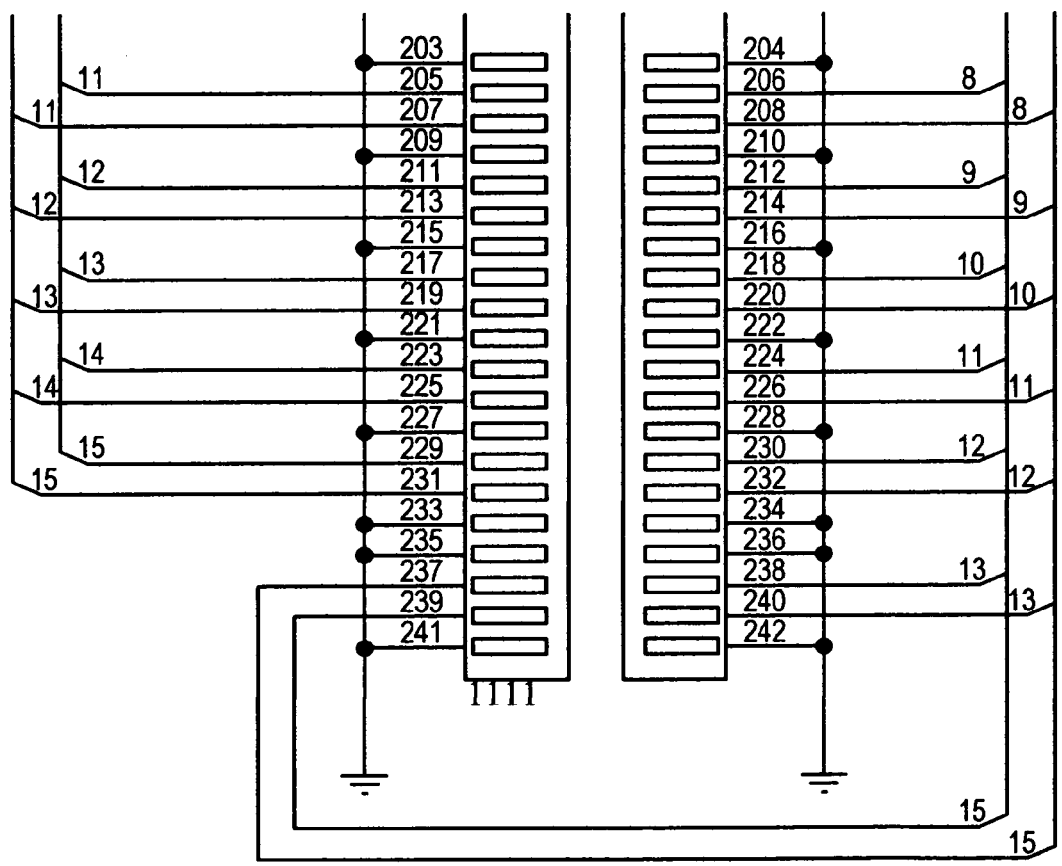

FIG. 5 and FIG. 6 show diagrams depicting the pin-out configuration of the edge connector 420 and the edge connector 430 of the translation device 400 respectively, in accordance with one embodiment of the present invention. As described above, routing matrices 421 and 422 implement the communications pathways in conjunction with the configuration connector 410 in order to configure the connectors 220 and 230 for their appropriate number of PCI Express lanes. FIG. 5 shows the pin-out configuration for the provision of a single 16 lane PCI Express connector on the motherboard 200. FIG. 6 shows the pin-out configuration for the provision of two 8 lane PCI Express connectors on the motherboard 200.

Figure 7:
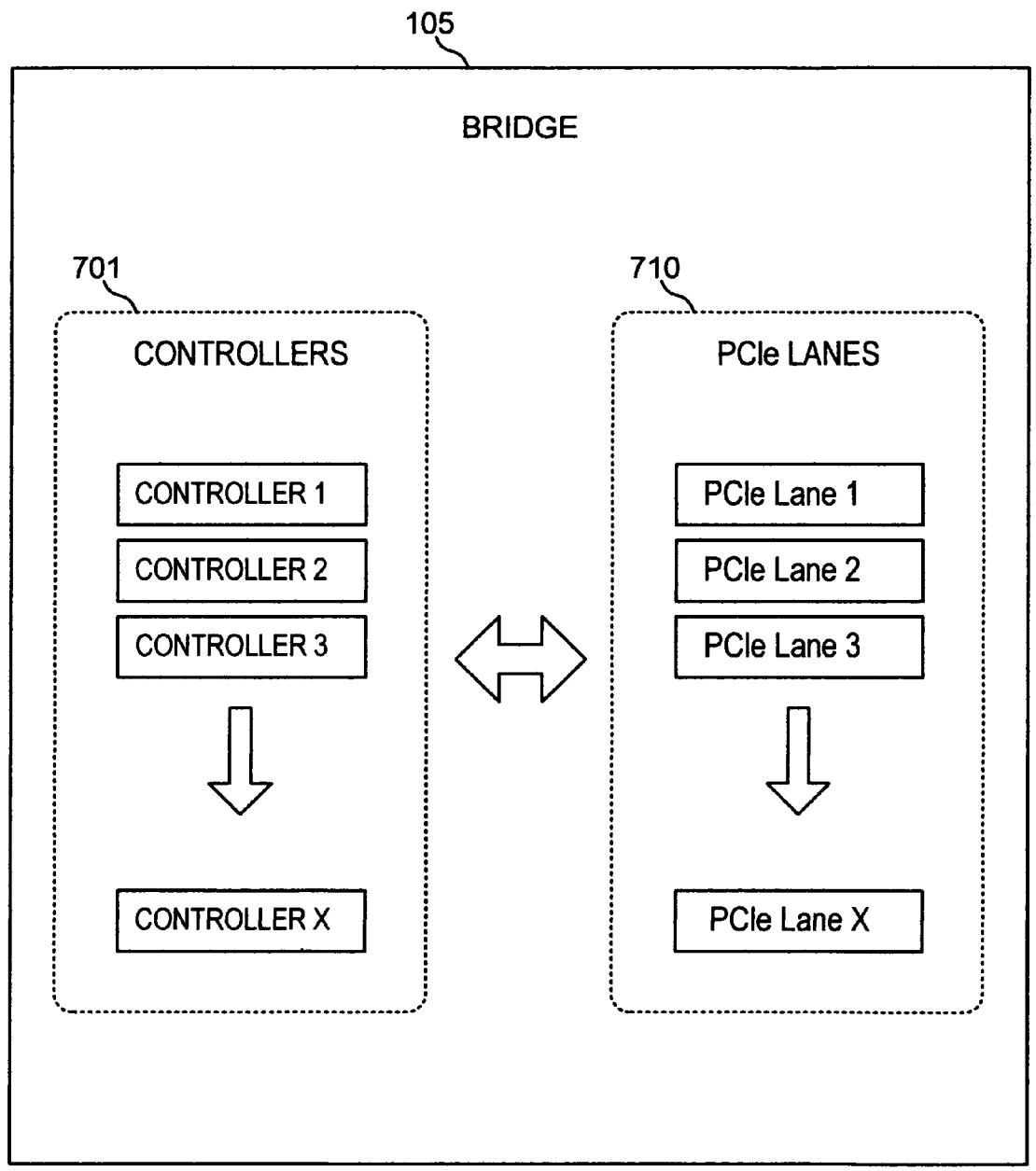
FIG. 7 shows a diagram depicting a plurality of PCI Express controllers for a plurality of PCI Express lanes in accordance with one embodiment of the present invention.

FIG. 7 shows a diagram depicting a plurality of PCI Express controllers for a plurality of PCI Express lanes as implemented within the bridge component 105, in accordance with one embodiment of the present invention. As described above, embodiments of the present invention can flexibly route PCI Express communication lanes from the bridge component 105 to different available PCI Express connectors. The bridge component 105 supports this capability by flexibly assigning controllers to the lanes. For example, although the bridge component 105 may support 20 PCI Express lanes, each lane is not required to have a dedicated controller. For example, in one configuration, the bridge component 105 uses one controller for a single high bandwidth (e.g., 16 lane) connector and one controller for each two additional single lane connectors. Thus, three controllers can support all 20 PCI Express lanes. In a second configuration, one controller each (e.g., controllers 1 and 2) can be used for two high bandwidth connectors (e.g., each having 8 lanes). The remaining 4 lanes can be controlled by a single controller (e.g., controller 3). It should be noted that alternatively, an additional number of controllers (e.g., controller x) can be incorporated assist in controlling the remaining 4 lanes, or any number of additional lanes (e.g., PCI Express lane x).

Figure 8:
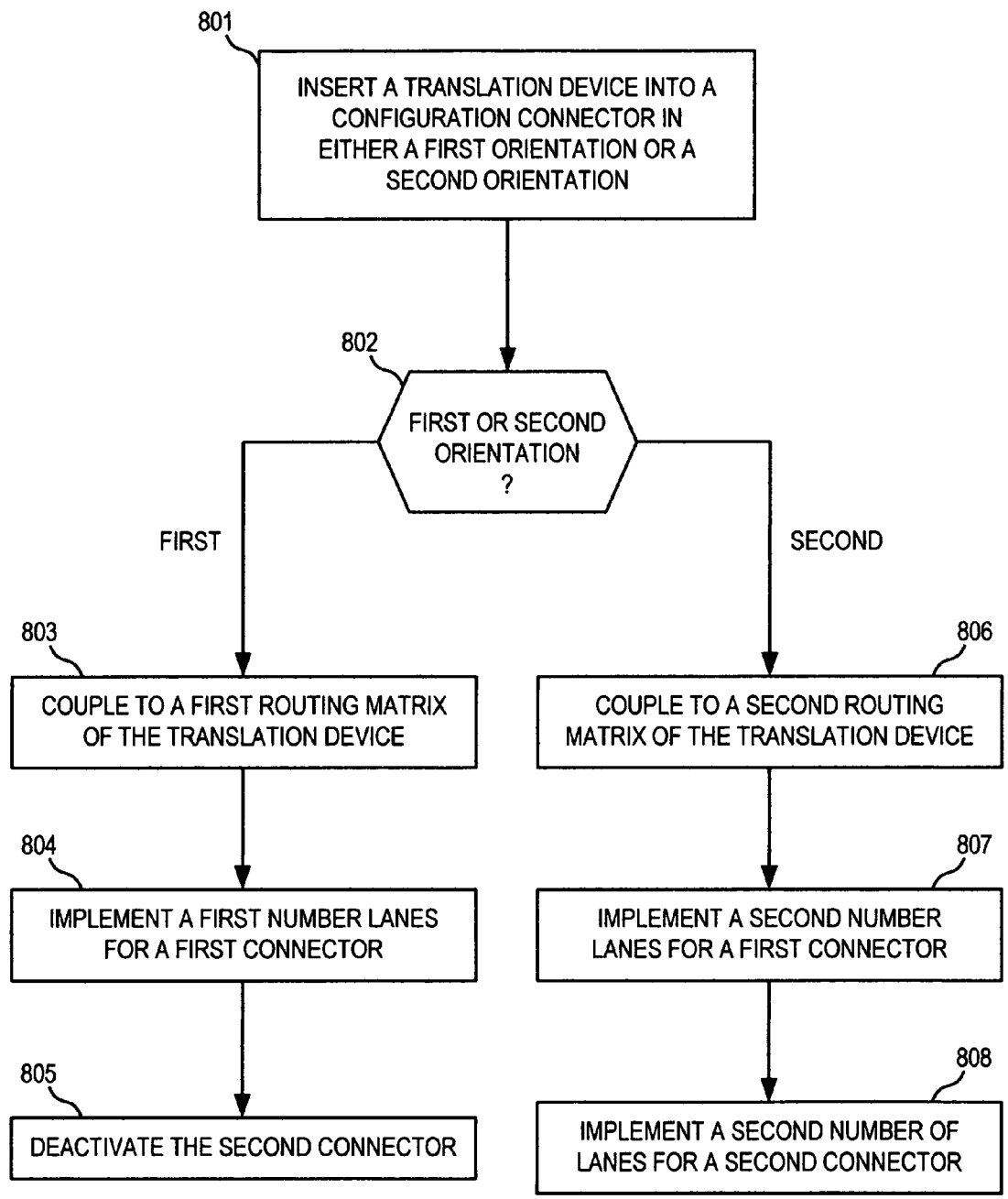
FIG. 8 shows a flow chart depicting the steps of a PCI Express connector configuration process in accordance with one embodiment of the present invention.

FIG. 8 shows a flow chart depicting the steps of a PCI Express connector configuration process 800 in accordance with one embodiment of the present invention. As depicted in FIG. 8, process 800 depicts the steps involved in a PCI Express connector configuration method as implemented by a motherboard bridge component and a translation device. Process 800 is described with reference to motherboard 200 as shown in FIG. 2.

Process 800 begins in step 801, where a translation device 400 (shown in FIG. 4) is inserted into the configuration connector 210 in either a first orientation or a second orientation. In step 802, depending upon the orientation of the translation device 400, process 800 proceeds to either steps 803-805, or steps 806-808. In step 803, in the first orientation, the bridge component 105 couples to a first routing matrix 421 of the translation device 400 via the edge connector 420. In step 804, a first number of lanes are implemented for a first PCI Express connector. For example, as described above, 16 lanes are implemented for the PCI Express connector 230. In step 805, the second PCI Express connector (e.g., PCI Express connector 220) is deactivated.

In step 806, in the second orientation, the bridge component 105 couples to a second routing matrix 431 of the translation device 400 via the edge connector 430. In step 807, a second number of lanes are implemented for the first PCI Express connector 230. In step 808, a second number of lanes are implemented for the second PCI Express connector 220. In this manner, as described above, embodiments of the present invention are able to configure 16 PCI Express lanes for the first connector, or to configure eight lanes for the first connector and eight lanes for the second connector.

Thus, graphics cards which cannot function with less than 16 PCI Express lanes in their connector can be reliably accommodated. Correspondingly, high-performance graphics rendering implementations which required dual graphics cards, each requiring a respective high bandwidth connector, can be reliably accommodated. This flexibility is accomplished through the use of a single motherboard incorporating the components of the present invention as described above.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a PCI Express bridge component, a method for selectively configuring a first PCI Express connector and a second PCI Express connector for different numbers of lanes, comprising:

coupling to a first routing matrix of a translation device in a first configuration or a second routing matrix of a translation device in a second configuration based on a first or second physical orientation of said translation device respectively wherein the first physical orientation and the second physical orientation are associated with physically different positions of the translation device;

implementing a first number of lanes for the first connector when the translation device is coupled in the first physical orientation; and implementing a second number of lanes for the first connector and the second connector when the translation device is coupled in the second physical orientation, wherein the second number of lanes is lower than the first number of lanes, and wherein the bridge component assigns a plurality of controllers to lanes of the first number of lanes and a plurality of controllers to lanes of the second number of lanes based on the first and the second physical orientation of the translation device that facilitate their routing to the first connector and the second connector wherein the first and second physical orientation comprise respective configurations wherein non-dedicated controllers are assigned to different lanes.

2. The method of claim 1, wherein the first orientation configures the first connector for 16 lanes and the second orientation configures the first connector for 8 lanes and the second connector for 8 lanes.

3. The method of claim 2, wherein the first orientation routes 16 lanes between the bridge component and the first connector.

4. The method of claim 2, wherein the second orientation routes 8 lanes between the bridge component and the first connector and routes 8 lanes between the bridge component and the second connector.

5. The method of claim 1, wherein a translation device connector is coupled to the bridge component and is adapted to removably mount the translation device in either the first configuration or the second configuration.

6. The method of claim 1, wherein the bridge component includes a crossbar for routing different numbers of lanes to the first connector and to the second connector.

7. An apparatus for selectively configuring a first PCI Express connector and a second PCI Express connector, comprising:
a PCB (printed circuit board);
a PCI Express first connector mounted on the PCB;
a PCI Express second connector mounted on the PCB;
a translation device connector mounted on the PCB; and
a bridge component mounted on the PCB and coupled to the first connector, the second connector, and the translation device connector, wherein the translation device connector is adapted to couple to a translation device in either a first physical orientation or a second physical orientation, wherein the first physical orientation configures the first connector for a first number of lanes and the second physical orientation configures the first connector for a second number of lanes, and wherein the second number of lanes are lower than the first number of lanes, and wherein the bridge component assigns a plurality of controllers to the first number of lanes and assigns a plurality of controllers to the second number of lanes based on the first and the second physical orientation of the translation device that facilitate their routing to the first connector and the second connector wherein the first and second physical orientation comprise respective configurations wherein non-dedicated controllers are assigned to different lanes.

8. The apparatus of claim 7, wherein the first orientation configures the first connector for 16 lanes and the second orientation configures the first connector for 8 lanes and the second connector for 8 lanes.

9. The apparatus of claim 8, wherein the first orientation routes 16 lanes between the bridge component and the first connector.

10. The apparatus of claim 8, wherein the second orientation routes 8 lanes between the bridge component and the first connector and routes 8 lanes between the bridge component and the second connector.

11. The apparatus of claim 7, wherein the translation device connector is adapted to couple to a first trace routing matrix of the translation device when the translation device is mounted in the first configuration, the first routing matrix configuring the first number of lanes between the bridge component and the first connector.

12. The apparatus of claim 7, wherein the translation device connector is adapted to couple to a second trace routing matrix of the translation device when the translation device is mounted in the second configuration, the second routing matrix configuring the second number of lanes between the bridge component and the first connector and configuring the second number of lanes between the bridge component and the second connector.

13. The apparatus of claim 7, wherein the translation device connector is adapted to removably mount the translation device in either the first configuration or the second configuration.

14. A translation device for selectively configuring a PCI Express first slot and a PCI Express second slot of a motherboard for different numbers of PCI Express lanes, comprising:
a substrate;
a first connector adapted to removably couple to a translation device slot mounted on the motherboard;
a second connector adapted to removably couple to the translation device slot;
a first trace routing matrix coupled to the first connector; and
a second trace routing matrix coupled to the second connector, wherein the translation device implements a first number of lanes between a bridge component and the first slot when the translation device is coupled in a first physical orientation to the translation device slot via the first connector, and implement a second number of lanes for the first slot and the second number of lanes for the second slot when the translation device is coupled in a second physical orientation to the translation device slot via the second connector, wherein the second number of lanes is lower than the first number of lanes, and wherein the bridge component assigns a plurality of controllers to the first number of lanes and assigns a plurality of controllers to the second number of lanes based on the first and the second physical orientation of the translation device that facilitate their routing to the first connector and the second connector wherein the first and second physical orientation comprise respective configurations wherein non-dedicated controllers are assigned to different lanes.

15. The translation device of claim 14, wherein the first trace routing matrix configures the first slot for 16 lanes and the second trance routing matrix configures the first slot for 8 lanes and the second slot for 8 lanes.

16. The translation device of claim 14, wherein the first connector is side opposite to the second connector.

17. The translation device of claim 14, wherein the second slot is deactivated when the device is coupled to the translation device slot via the first connector.

* * * * *